United States Patent Office 3,360,101
Patented Dec. 26, 1967

3,360,101
APPARATUS FOR TRANSFERRING A ROW OF BAKERY PANS
Willem de Ridder, Bachlaan, Voorschoten, Netherlands
Filed Feb. 28, 1966, Ser. No. 530,284
Claims priority, application Netherlands, Mar. 3, 1965, 65—2,726
2 Claims. (Cl. 198—25)

ABSTRACT OF THE DISCLOSURE

Apparatus for transferring a row of bakery pans comprising a first conveyor, a second conveyor adjacent the delivery end of the first conveyor and extending transversely to the first conveyor, a roller between the two conveyors having its upper side substantally level with the conveying surface of the first conveyor, which is mounted to rotate freely on an axis substantially parallel to the second conveyor and which has regularly spaced longitudinal projections the spacing and height of which are such that a row of pans advancing from the first conveyor will slide upon the edges of two adjacent projections, the conveying surface of the second conveyor being lower than that of the first conveyor by an amount such that the dumping which occurs when the roller is overbalanced by a row of bakery pans will cause the bakery pans to slide onto the second conveyor.

Background of the invention

The present invention relates to an apparatus for transferring articles, particularly bakery pans, from a delivery conveyor, to a transverse conveyor, comprising a transferring member between the delivery end of the delivery conveyor and the transverse conveyor.

A well-known apparatus of this kind is provided with a gliding surface between the adjacent ends of the two conveyors, said gliding surface taking a fixed inclined position. It is a drawback of this well-known apparatus that there is no sufficient guarantee that the pans will be transferred to the transverse conveyor in the right positions. It has been found that, when the pans are initially put on the delivery conveyor—properly positioned—which will be the case when the delivery conveyor is the unloading conveyor of an automatic oven—the pans may take an oblique position with respect to the conveying direction when they are sliding on the inclined gliding surface. On this gliding surface the pans may readily perform turning movements as a result of their bottom surfaces being not completely flat and having non-uniform smoothness.

Summary of the invention

In the apparatus constructed in accordance with the present invention the transferring member is a freely rotatable roller, the circumferential surface of which is provided with projections adapted to provide for friction engagement with the articles to be transferred.

In a preferred embodiment of the invention the said projections of the roller are in the form of longitudinal ribs having a substantially triangular cross section.

It has been found that the freely rotatable roller of the present invention compensates for undesired tendencies to turning and lagging of the pan couples.

Brief description of the drawing

Other objects and advantages of the invention will become apparent from the following description of a preferred embodiment of the present invention with reference to the accompanying drawings in which.

Description of the preferred embodiment

With reference to the drawings 1 designates the delivery end of a conveyor, discharging the bakery pans 2—which are usually united into "couples" of four pans—from an automatic oven (not shown). The pan couples are arranged in transverse rows, which are to be successively transferred onto a transverse conveyor 3 the upper run of which is at a lower level than that of the delivery conveyor 1. The transfer is effected by a roller 4, which may freely rotate and which is provided with longitudinal ribs having a triangular cross-sectional shape.

Figure 1:
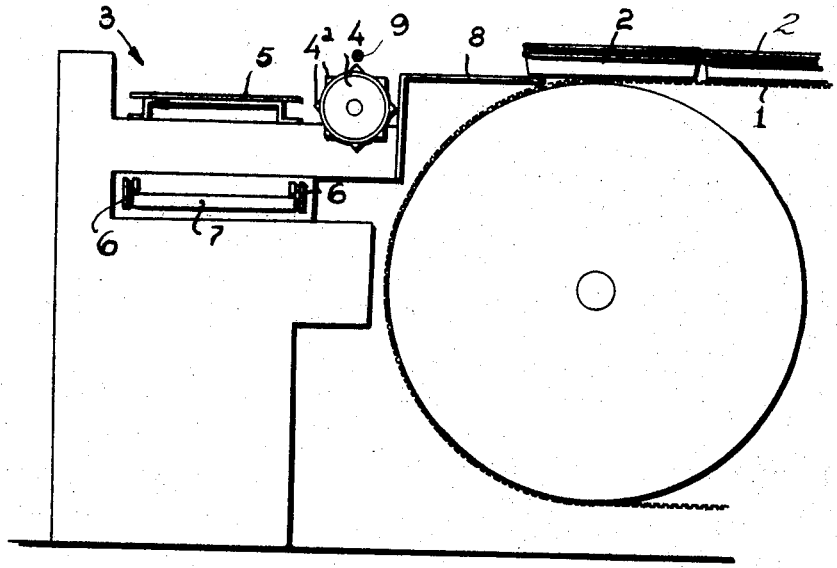
FIG. 1 is a diagrammatic side elevation of the apparatus according to this invention, disposed between the delivery end of the conveyor of an oven and a transverse conveyor.
Figure 2:
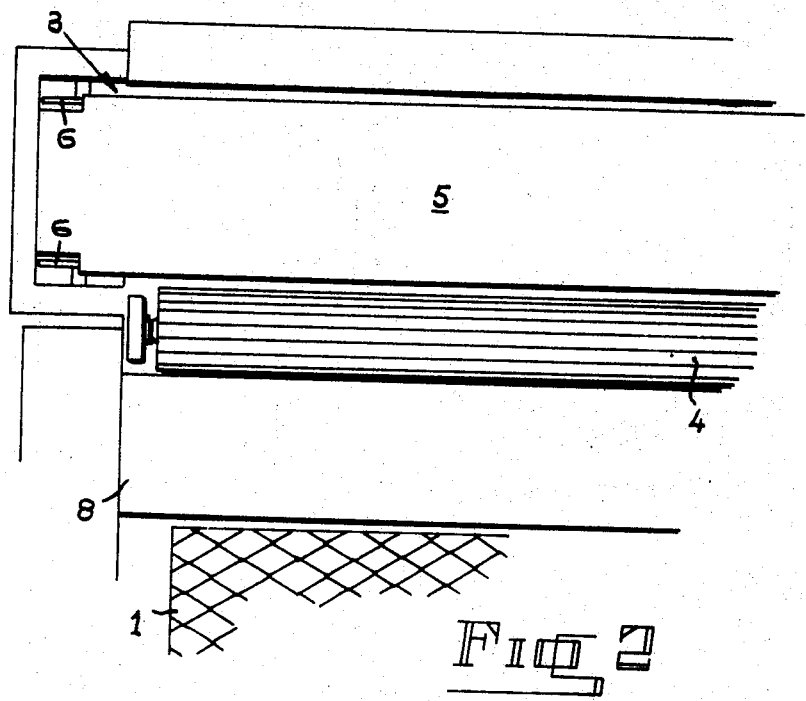
FIG. 2 is a plan view of apparatus shown in FIG. 1.

In the embodiment shown in the drawings the transverse conveyor 3 comprises a fixed supporting plate 5 in the plane of the upper run of the conveyor and two endless chains 6 carrying a transversely disposed pusher bar 7 between them. The chains 6 are arranged to move the pusher bar 7 on the supporting plate 5 so as to take along any pan couple on said plate towards the discharge end of the transverse conveyor. In FIG. 1 the pusher 7 is shown in a rest position in the lower run of the transverse conveyor.

Figure 3A:
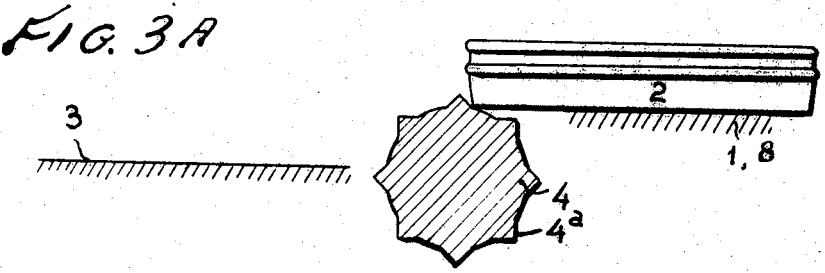
FIGS. 3A, 3B, and 3D show a number of successive phases of movement of an article during its transfer from the delivery conveyor to the transverse conveyor.
Figure 3B:
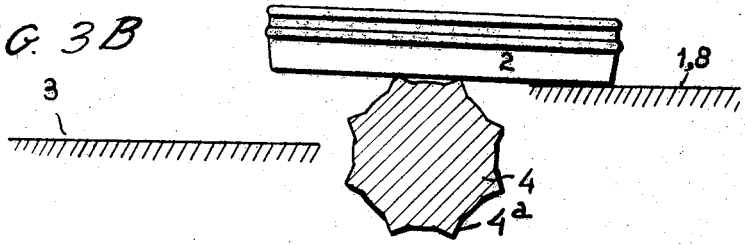
Figure 3C:
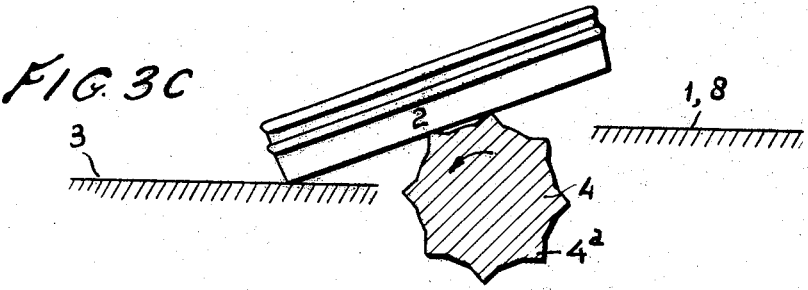
Figure 3D:
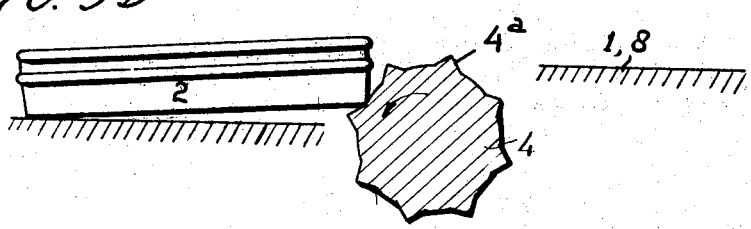

In operation, when the delivery conveyor 1 is continuously discharging the rows of pan couples from the oven. The very left row of pan couples, as seen in FIG. 1, will be moved on the glide plate 8 at the end of the conveyor 1 into contact with the roller 4 (FIG. 3A). Then as a result of the pushing effect of the following rows of couples on the moving conveyor the said row of pan couples will slide further on a support surface which is formed by two successive ribs 4a of the roller 4 (FIG. 3b). As soon as the centre of gravity of the individual pan couples of said row has moved beyond the vertical plane through the axis of the roller 4, the couple(s) will tend to dump over the roller and to drive the latter in the direction as indicated in FIG. 3c.

In this stage some pan couples may slide into the transverse conveyor easily and smoothly, whereas others may meet with some resistance at their leading edge. This resistance, however, is effectively overcome by the kinetic energy of the roller driven by the easily and smoothly dumping pan couples. It will thus be understood that the roller 4 also compensates for tendencies to "stick" or lag of any of the pan couples.

In the embodiment shown the pusher bar 7 is periodically driven. It is actuated as soon as the row of pan couples to be transferred has passed over the roller 4 and no longer interrupts the light beam emitted by a light source towards a photo-electric cell, diagrammatically indicated at 9.

The row of pan couples put on the supporting plate 5 of the transverse conveyor 3 will then be pushed towards the discharge end of the conveyor 3 by means of the pusher bar 7, the movement of which is stopped when it engages a switch (not shown) in the lower run of its path.

It will be appreciated that at the time the pan couples are dumping over the roller 4 their movement towards the transverse conveyor will be accelerated, which spaces these pan couples from the next row of pan couples and makes it possible to discharge the transferred pan couples before the next row is put on the transverse conveyor.

What I claim is:

1. An apparatus for transferring a row of bakery pans, comprising a first conveyor, and a second conveyor adjacent the delivery end of the first conveyor and extending transversely to the first conveyor, wherein the improvement comprises a roller between the two conveyors having its upper side substantially level with the conveying surface of the first conveyor, which is mounted to rotate freely on an axis substantially parallel to the second conveyor, and which has regularly spaced longitudinal projections the spacing and height of which are such that a row of pans advancing from the first conveyor will slide upon the edges of two adjacent projections, the conveying surface of the second conveyor being lower than that of the first conveyor by an amount such that the dumping which occurs when the roller is overbalanced by a row of bakery pans will cause the bakery pans to slide onto the second conveyor.

2. An apparatus according to claim 1 wherein the roller is in the form of a star wheel.

References Cited
UNITED STATES PATENTS

| | | | |
|---|---|---|---|
| 1,299,198 | 4/1919 | Low et al. | 198—103 X |
| 1,860,718 | 5/1932 | Mott | 198—25 |
| 2,576,891 | 11/1951 | Reynolds | 198—29 |
| 2,773,583 | 12/1956 | Rand et al. | 198—32 X |

FOREIGN PATENTS 1,324,669   3/1963   France.

EVON C. BLUNK, *Primary Examiner.*

M. L. AJEMAN, *Assistant Examiner.*